US006266575B1

(12) United States Patent
Anderson, Jr. et al.

(10) Patent No.: US 6,266,575 B1
(45) Date of Patent: Jul. 24, 2001

(54) CLIENT-SERVER SYSTEM, METHOD AND COMPUTER PRODUCT FOR MANAGING DATABASE DRIVEN INSERTION (DDI) AND MAIL PIECE TRACKING (MPT) DATA

(75) Inventors: Ralph R. Anderson, Jr.; Mark G. Mackelprang, both of Tucson, AZ (US)

(73) Assignee: Bell & Howell Mail and Messaging Technologies Company, Durham, NC (US)

( * ) Notice: Subject to any disclaimer, the term of this patent is extended or adjusted under 35 U.S.C. 154(b) by 0 days.

(21) Appl. No.: 09/428,028

(22) Filed: Oct. 27, 1999

Related U.S. Application Data

(62) Division of application No. 09/183,811, filed on Oct. 30, 1998, now Pat. No. 6,119,051.
(60) Provisional application No. 60/105,804, filed on Oct. 27, 1998.

(51) Int. Cl.[7] .......... G06F 7/00
(52) U.S. Cl. .......... 700/221; 700/226
(58) Field of Search .......... 700/220, 221, 700/223, 224, 226; 395/200.33; 270/58.31, 52.19; 209/584, 583, 900, 939

(56) References Cited

U.S. PATENT DOCUMENTS 4,527,468 * 7/1985 Piotroski .......... 101/2
4,800,505 * 1/1989 Axelrod et al. .......... 364/478
4,817,042 * 3/1989 Pintsov .......... 364/478
4,947,333 * 8/1990 Sansone et al. .......... 364/464.02
4,999,481 * 3/1991 Baer et al. .......... 235/375
5,179,522 1/1993 Scibe .
5,283,752 2/1994 Gombault et al. .
5,419,440 * 5/1995 Picoult .......... 209/583
5,469,576 * 11/1995 Dauerer et al. .......... 395/186
5,612,888 * 3/1997 Chang et al. .......... 364/478.09
5,754,434 5/1998 Delfer et al. .
5,777,883 * 7/1998 Lau et al. .......... 364/478.08
5,873,073 * 2/1999 Bresnan et al. .......... 364/400
5,918,220 * 6/1999 Sansone et al. .......... 705/408
6,119,051 * 9/2000 Anderson, Jr. et al. .......... 700/221

* cited by examiner

*Primary Examiner*—Christopher P. Ellis
*Assistant Examiner*—Khoi M. Tran
(74) *Attorney, Agent, or Firm*—Jenkins & Wilson, P.A.

(57) ABSTRACT

A client/server architecture for database driven insertion and mail piece tracking system, method, and computer program product is disclosed. A database is populated with database driven insertion data comprising instructions for handling mailpiece material. A server manages the database by responding to requests for mail processing instructions from clients and storing mailpiece data received from clients. A scanning device reads key code marked mailpiece material in which the key code corresponds to a database location containing instructions for handling mailpiece material. A client processor receives the key code from the scanning device, and transmits a request to the server for accessing the database location containing the instructions for handling mailpiece material. The server retrieves the instructions for handling mailpiece material, and transmits the instructions to the client. The client causes the performance of a mail processing task in accordance with the instructions, gathers mailpiece tracking data as the mailpiece material is processed, and forwards mailpiece tracking data to the server. The database information is accessible to report writing and generating software applications which cull data pertaining to a given mail processing job into a desired format.

4 Claims, 1 Drawing Sheet

CLIENT-SERVER SYSTEM, METHOD AND COMPUTER PRODUCT FOR MANAGING DATABASE DRIVEN INSERTION (DDI) AND MAIL PIECE TRACKING (MPT) DATA

CROSS-REFERENCE TO RELATED APPLICATIONS

This application is related to and claims the benefit of the U.S. Provisional Patent Application entitled "A Client-Server System and Method Of Managing Database Driven Insertion (DDI) and Mail Piece Tracking (MPT) Data", filed on Oct. 27, 1998, Ser. No. 06/105,804 and is a divisional of U.S. patent application Ser. No. 09/183,811, filed Oct. 30, 1998 (U.S. Pat. No. 6,119,051).

FIELD OF THE INVENTION

The present invention relates generally to manufacturing environments that wish to relate large amounts of information to a small identifier. More specifically, the present invention relates to a client-server system, method, and computer program for managing database driven insertion (DDI) and mail piece tracking (MPT) data for holding and managing mailroom data in a consistent and easy to use manner.

BACKGROUND OF THE INVENTION

Currently, it is common in mail processing for mail piece data to be handled utilizing a file-based system (i.e. using a flat ASCII file to hold all database driven insertion and mail piece tracking information). A client/server concept involves replacing flat files with a database server which maintains indices and relations between various data fields, as described further hereinbelow. Also as described further hereinbelow, utilizing a client-server concept, as according to the present invention, allows an interface to be developed for client programs to be able to read database driven insertion (DDI) data from the database and write mail piece tracking data back to the database.

Database driven insertion (DDI) is currently being accomplished in conventional mail processing by storing mail processing instructions in a flat ASCII file, reading an account number from paper via a laser scanner, calculating the offset of the data in the file that corresponded to the account number read, and reading the data at that offset point into the mail processing equipment. Mail piece tracking has been accomplished by storing information about a mailpiece back into the database driven insertion (DDI) file, or possibly a separate file whenever the mailpiece processing was complete. This was, and still is, the industry norm because it is believed that a database is not capable of keeping up with the read and write rates required for multiple mail processing machines. In contrast to this norm, the present invention, however, can and does keep up with the read and write rates required for multiple mail processing machines using the aforementioned client/server concept, as described further hereinbelow.

Database driven insertion (DDI) data typically describes to individual mail processing inserters which inserts to feed, how many sheets are in an account, what actions the inserter is to perform on the account, what address should be printed on the envelope, and/or other information as apparent to those of skill in the art.

Mail piece tracking (MPT) data typically describes what actually happened to the account during processing, i.e. what machine processed it, when the machine started processing it, when the machine finished processing it, which operators were running the machine, which inserts fed, and/or other information as apparent to those of skill in the art.

Using a database under a client/server architecture (as opposed to a flat ASCII file) for insertion and tracking has many significant advantages which will be readily appreciated by those of skill in the art. Clients (which can comprise mail inserters, mail sorters, printers, other applications, and/or other suitable clients as recognized by those of skill in the art of mail processing) can request and receive only the information they need which decreases the overall load borne by the communications network. Other clients (report generators) can create reports much easier with well known database reporting tools. The server provides a common repository for all mail piece tracking and database driven insertion data, which, in turn, allows management from one computer and location, i.e. centralized operation. The database server provides excellent file locking and read/write contention protection superior to that of ASCII flat files. The server also provides services to inform clients whether a record was updated "underneath" it. This provides site-wide duplicate checking for all mailpieces to ensure there are no duplicate mailpieces being processed. Additionally, the database server enforces data consistency. The server will not allow clients to write "invalid" data into the database. This is very difficult to enforce in file-based systems. The server further provides "stored procedures" which allow the server to change its functionality without necessarily modifying client code. Other advantages can also exist as recognized by those skilled in the art.

In view of the above, there remains much room for improvement in the art, particularly for a new system and method of "publishing" and "recording" database driven insertion and mail piece tracking data.

DISCLOSURE OF THE INVENTION

In accordance with the present invention, a novel client-server system, method, and computer program for managing database driven insertion (DDI) and mail piece tracking (MPT) data for holding and managing mailroom data in a consistent and easy to use manner is provided. "Managing" of data according to the present invention refers to a system that controls, utilizes, tracks, and reports on all aspects of database driven insertion and mail piece tracking data. By the client/server database architecture for managing database driven insertion and mailpiece tracking in a mail processing environment according this invention, a customer initially sets up a mail processing site by defining within the client/server architecture running database driven insertion and mail piece tracking system parameters such as Users, Privileges, JobSetups, Materials, etc., before any actual mail processing occurs. Next, the customer generates data (generally in a mainframe environment) that is intended to be printed and mailed. The data is run through a utility like Bell & Howell's Transformer™ or their own custom software to create a "side file" that contains the database driven insertion information required by a mail processing insertion device. Each print run has a matching side file generated for it. Material is printed and the side file is loaded/inducted into the database driven insertion and mail piece tracking system. The customer physically conveys the printed material to the inserter, loads the mail processing job currently programmed, places the materials called for by the mail processing job (e.g., inserts, printed materials, envelopes, etc . . . ) into the correct locations, and begins running the mail processing job. As a mail processing inserter reads each reader code or key that has been strategically placed on the mailpiece materials, the inserter makes a request for the database driven insertion data associated with that particular key from the database. The database sends the insertion data back to the inserter, which uses the data to determine what actions to perform on this particular account. As each mailpiece leaves the inserter, mail piece tracking data is written into the database associated with each database driven insertion record that records, for instance, the Machine, Operators, Time, Date, JobSetup, Inserts Fed, etc., for each mailpiece.

It is therefore an object of the present invention to provide a novel client-server system, method, and computer program for managing database driven insertion (DDI) and mail piece tracking (MPT) data for holding and managing mailroom data in a consistent and easy to use manner.

It is another object of the present invention to store all types of data in the database driven insertion server that are related to the other types of data in a way that makes generating very flexible and detailed reports very easy.

It is a further object of the present invention to be able to modify instructions regarding the processing of each mailpiece right up until the time the mailpiece is placed on a machine for processing.

It is a still further object of the present invention to generate a standard postal manifest that details all pieces processed and the amount owed the post office.

It is a still further object of the present invention to re-produce a list of mailpieces processed properly and mailpieces that did not process properly.

Some of the objects of the invention having been stated, other objects will become evident as the description proceeds, when taken in connection with the accompanying drawings described below.

BRIEF DESCRIPTION OF THE DRAWINGS

The foregoing advantages and features of the present invention will be appreciated more fully from the following description with reference to the accompanying drawings in which.

BEST MODE FOR CARRYING OUT THE INVENTION

Figure 1:
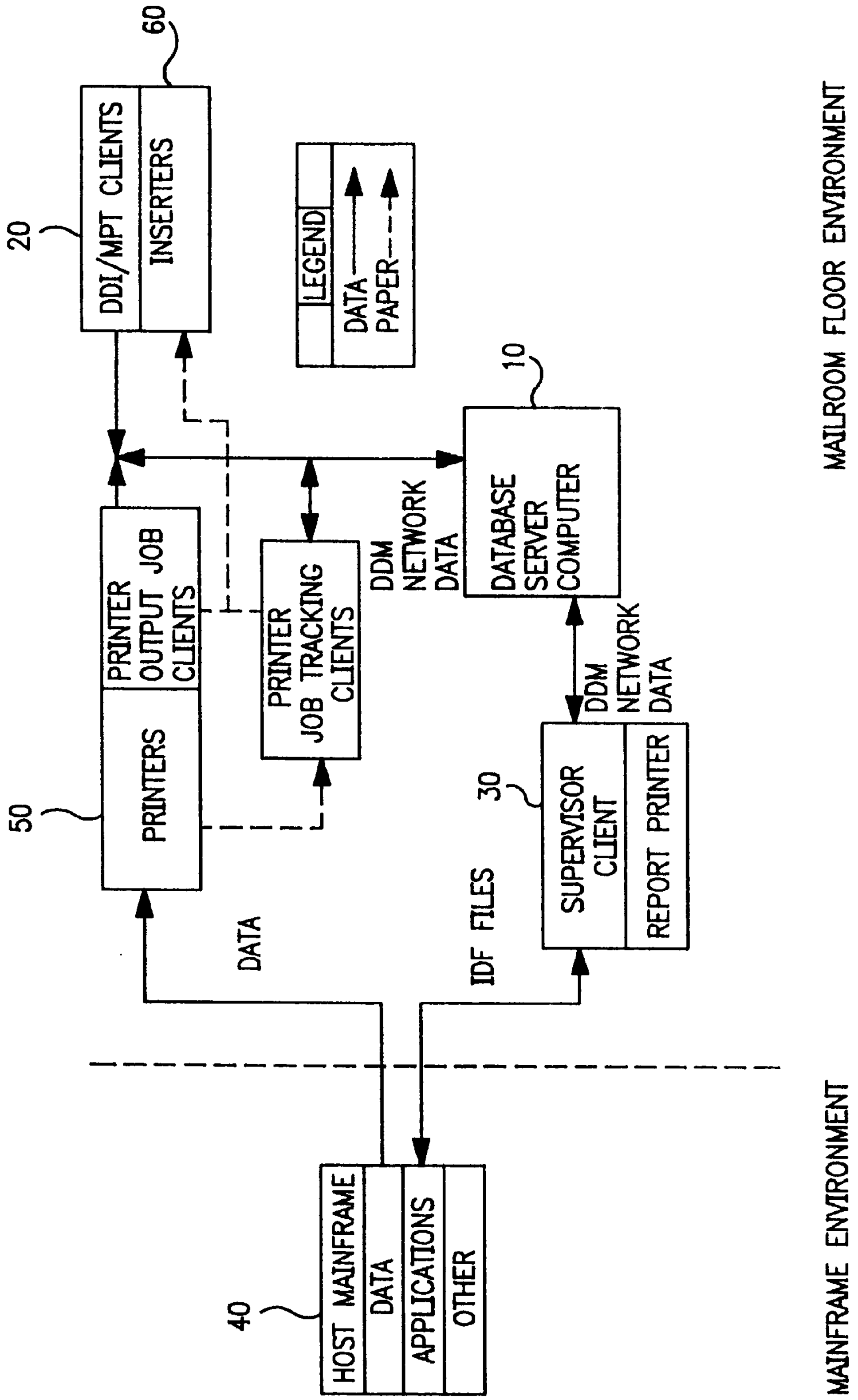
FIG. 1 illustrates a client/server architecture capable for use with the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to FIG. 1, one possible client/server architecture is shown which includes a database server computer 10 used as the central repository of all data, a machine client computer (console) 20, a supervisory computer (supervisor) 30, and a computer network for operatively linking everything together. Solid lines represent electronic data flow while dashed lines represent physical paper or material flow throughout FIG. 1. The preferred embodiment presently uses Microsoft Windows™ NT Server 4.0 software, Interbase™ Server 5.01, and custom written software running on the server machine and Interbase™ client software and/or custom written software running on the client machines. The hardware is generally Intel Pentium™ II class generic personal computer boxes.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described.

Still referring to FIG. 1, applications on the mainframe side send print images from a host mainframe 40, for instance, to printers 50, and IntellaSert™ Data File (IDF) data to the database server computer 10. Once the material is printed on by the printers 50 (which can be monitored by a reconciliation station), the printed paper is presented to mail processing finishing equipment, such as, for instance, mail processing inserters 60. The mail processing finishing equipment 60 requests information about the accounts it is about to process from the database server 10, using a small key encoded in the account barcode, and uses the information in the data file to continue processing the account. When the account has been completely processed (either rejected, removed, or ready to mail), the finishing equipment 60 updates the database with a complete disposition of the account. The exact status and location of each account is available at all times to users having access to the supervisor client computer 30. Once processing has been completed, the supervisor client computer 30 can create a manifest to present to the United States Postal Service (USPS), and for any pieces that were destroyed during processing, it can feed the pertinent data back to the host to generate reprint material and new IDF data. Alternately, supervisor client computer 30 can send data to a local "Winserter"-type mail processing device to create reprints locally. This allows accounts to be handled in a totally "closed loop" fashion.

The description of the present invention describes services provided by the database server computer 10 and application interfaces provided for client applications. These services are intended to provide all the basic services available in the software system design, including data file, database driven insertion, historical reports, real time monitoring of machinery, operators, jobs, shifts, inserts tracking and chargeback, manifesting, reprinting, and/or other suitable services apparent to those of skill in the art, while adding the ability to significantly extend the feature set, all without harming backwards compatibility.

A dataset, according to the present invention, is a named compilation of related data stored on the server. Datasets are composed of ordered records, which are accessed by a record identifier. Conceptually, datasets can be envisioned as virtual files which support normal file services such as create file, open file, close file, delete file, read record, write record, and append record. Additionally, datasets have the ability to delete records, provide multiple views of records, create a new dataset based on an existing dataset, and some search criteria among other abilities. All datasets have one thing in common, namely, each dataset record has an attribute called "RecordID". The "RecordID" field defines the order of records in a dataset. The attribute "RecordID" may be stored inside the record, or may be implicitly designed by the dataset itself. In either case, users of a dataset need only know that every record "knows" its position, and every dataset "knows" its order.

A record is the basic element of a dataset. This is the smallest element that can be modified in a dataset. Note that a record from a client point of view, and a record from a server point of view may be different for both the read and write cases. Clients may view a record as only a very small number of fields, whereas the server may actually have many fields for every record. As long as the client fields are a subset of the server fields, the server will send only the fields requested back to the client.

A RecID is the basic "key" column for any dataset. The word "key" is emphasized, because this in no way implies that datasets are indexed databases. It is meant to infer the function of a key field. All dataset records have a RecordID which starts at 1, and increases sequentially allowing elements of the dataset to be accessed by clients using the read record, update record, delete record, insert record, append record, open dataset, close dataset, seek record, and tell record type methods available in the standard "C" File/IO function set. Note that the actual order of data records in the dataset is both unknown and irrelevant. Unknown because the server can implement it in any way it chooses, and irrelevant because the server's only constraint on returning the dataset record to the client is that it happens "fast enough".

Views are defined by the services layer to provide data of interest from a dataset. A view defines all the fields needed from a record in a dataset. A record in a dataset can have many views defined simultaneously, and the data needed by the client defines which view is used. There are two (2) main uses for views in the client services. In the case of reading records from a dataset, the view defines the set of fields the client wants the server to return for each record read. In the case of writing records from a dataset, the view defines the set of fields the client must send to the server for each record written.

DDM stands for device and data management and refers to a (set of) client and server computer(s) that contain a large set of data relating current documents and past documents, along with tools to allow management of this data. The database server computer will never serve file or print services, as its only purpose is to provide data services through a suite of applications. These applications will be network communication based.

One feature of the present invention is termed the client developers kit (CDK). It is an application programming interface which allows a client to be developed using any platform that has an Interbase™ client library available. The client developers kit application programming interface gives access to data of interest without having to know about or understand the details of the database.

Mail piece tracking refers to, inter alia, a client's ability to report the disposition of a mailpiece without necessarily being able to use the database driven insertion data defined in a record. This feature can be used for reprint generation and for generating manifests.

Database driven insertion and processing data file (process directive file) are terms referring generally to the concept of having a electro-mechanical piece of equipment (an inserter, for example) associate large amounts of data with a small "key" or identifier printed on the material via codes (or other machine readable method). The data referred to by the "key" is changeable up to the moment the data is read and "placed" on the equipment. The data can supply (but is not limited to) address information for printing on envelopes, which inserts to drop on this individual account, whether this account should be stapled, etc. Of particular interest is a small piece of the data that allows inserts to be targeted to accounts individually.

The term "stream" relates to input devices, such as continuous forms cutters and cut sheet feeders on a mail processing inserter. For instance, a mail processing inserter with two cutters and one sheet feeder is deemed to have three (3) streams. Hence, streamSheet0l, streamSheet02, and streamSheet03 in the data file fields are filled. By convention, the most "upstream" mail processing device is said to be stream 1.

Another feature of the present invention is its ability to provide for duplicate checking. As the client inserter "finishes" each mailpiece, the disposition of the mailpiece is saved in the data file data set via the data file account ID. The database driven insertion client can now provide real-time duplicate checking for the client inserter. If any other machine on the network has processed or is currently processing the mailpiece in question, the "latest" copy of the mailpiece will be deemed duplicate. A warning message will print on the client computer screen, and the mailpiece will be targeted for the reject bin.

It always has been and will always be possible for a printer operator or other worker(s) on the mailroom floor to introduce duplicate copies of already existing material into the processing environment. To detect and remedy these problems as soon as possible, the data file (IDF) system includes real-time duplicate checking software. Overall, there should be no instances where the data file system does not detect a duplicate account. In nearly all cases, it will detect and reject them in real-time. In some cases where duplicate accounts are being processed within one (1) minute of each other on different inserters within the same network, the system will not be able to warn the operator of the duplicate until the second of the duplicate accounts exits the machine.

When two or more machines process the same data with overlapping material the printer operator backs up the print job between stacks of paper. Database driven insertion clients would not be able to detect these errors by themselves, since the account sequencing information would be correct. Depending on how close in time the various mail processing machines processed the material, this case would be caught either by the "Server Reads Data" case or the "Server Writes Data" case.

Should a stack of material on a single machine have duplicate material (from a printer rollback, for example) in the middle of the stack, the database driven insertion client would catch the first duplicate, because the account sequence there would be invalid. If more than one account were duplicated, however, the rest of the accounts would process normally. Duplicate checking detects this problem in the "Client Receives Data" case, the "Server Reads Data" case, or the "Server Writes Data" case, depending on the timing.

In the "Server Reads Data" case, when the server receives a request for an account record, it checks the final destination field of that record. If it is 'NP' (not processed), 'OR'

(operator removed), or 'R2' (reject bin), the server changes nothing and passes the data record down to the client for processing. If the final destination is anything different than those mentioned above, the server sets the target destination of the account to 'DP' (duplicate), which will result in the account being sent to the reject bin. The client, whenever it receives a 'DP' target destination, can inform the operator that a duplicate account will be rejected.

In the "Server Writes Data" case, when the server receives data back from the client to write into the data file database, it will know whether the record in the database has been modified. If it has been modified, the server checks to see if the final destination is set to an invalid destination. If it is, it will set the final destination of the record to 'DP' (duplicate), and send a message to the client to inform the operator that a duplicate mailpiece exists.

should not be processed, and wants to require the inserter operator to remove the account from the mailing.

When the client reports a finished account to the server, the server determines the final disposition of the mailpiece by comparing the "current" disposition with the "new" disposition. Based on these two values, it chooses to increment (or not) a value called the "Duplicate Count" (this is the first value in each cell in the table below) and decides whether to save the "new" data into the table (the second value in each cell of the table below). Lastly, the server returns a status for every write, and if the status is affected by the destinations, the status is listed in the third row of each cell. The following table of new and existing final destinations describes the rules governing every possible new and existing final destination:

TABLE 1

Duplicate Destinations

| | EXISTING FINAL DESTINATION | | | | | | |
|---|---|---|---|---|---|---|---|
| | SH | SD | OW | RX | OR | NP | LH |
| SH | 1<br>No<br>ERR_DUP | 1<br>No<br>ERR_DUP | 1<br>No<br>ERR_DUP | 0<br>Yes<br>ERR_NON | 0<br>Yes<br>ERR_NON | 0<br>Yes<br>ERR_NON | 1<br>No<br>ERR_LH |
| SD | 1<br>No<br>ERR_DUP | 1<br>No<br>ERR_DUP | 1<br>No<br>ERR_DUP | 0<br>Yes<br>ERR_NON | 0<br>Yes<br>ERR_NON | 0<br>Yes<br>ERR_NON | 1<br>No<br>ERR_LH |
| OW | 1<br>No<br>ERR_DUP | 1<br>No<br>ERR_DUP | 1<br>No<br>ERR_DUP | 0<br>Yes<br>ERR_NON | 0<br>Yes<br>ERR_NON | 0<br>Yes<br>ERR_NON | 1<br>No<br>ERR_LH |
| RX | 0<br>No<br>ERR_NON | 0<br>No<br>ERR_NON | 0<br>No<br>ERR_NON | 0<br>Yes<br>ERR_NON | 0<br>Yes<br>ERR_NON | 0<br>Yes<br>ERR_NON | 0<br>No<br>ERR_NON |
| OR | 0<br>No<br>ERR_NON | 0<br>No<br>ERR_NON | 0<br>No<br>ERR_NON | 0<br>Yes<br>ERR_NON | 0<br>Yes<br>ERR_NON | 0<br>Yes<br>ERR_NON | 0<br>No<br>ERR_NON |

In the "Client Receives Data" case, when the client receives a record from the server, it checks all the accounts that it is currently processing. If it finds a matching account, it will set the target destination of the new duplicate account to 'DP'. This account will eventually go to the reject bin.

The abbreviations used in the tables below are explained defined as:

SH Standard Handling (The destination(s) for "Good" mailable mail).

SD Security Divert. (The destination(s) for "Special" mail)

OW Overweight Divert. (The destination(s) for material that is too heavy or too thick to be mailed).

RX Reject Divert. (The destination(s) where "bad" or damaged material is sent).

OR Operator Removed. (The destination where material that is removed by the operator is sent).

NP The initial or Not Processed destination. This flag indicates the mailpiece must be recreated.

DP Duplicate Account. This indicates that the account was processed at least twice (i.e. more than one copy of this account went to 'SH', 'SD', or 'OW'.

LH Late Hold. This indicates that the user (via a pre-processing function) has determined that the account When data file data is read from the database, if the duplicate count of the record is greater than zero, the final destination is returned as 'DP', regardless of what the actual final destination in the data is. The only exception to this is where the final destination is 'LH'. In this case, the final destination returned is 'LH', regardless of what the actual duplicate count is. The following table delineates these rules:

TABLE 2

Duplicate Destination Read Rules

| | FINAL DESTINATION | | | | | | |
|---|---|---|---|---|---|---|---|
| | SH | SD | OW | RX | OR | LH | NONE |
| 0 | SH | SD | OW | RX | OR | LH | NP |
| >0 | DP | DP | DP* | DP* | DP* | LH | DP* |

Note that there should never be final destinations of OW, RX, OR, or NONE with a duplicate count greater than zero. These cases are handled as data integrity errors.

When a user "fixes" the problem with a duplicate (or Late Hold), the client can call the "ReleaseDuplicate" application programming interface which will decrement the duplicate count, return the current duplicate count and a status code. The table describing these rules is as follows:

TABLE 3

| Release Duplicate Actions | | | | | | | |
|---|---|---|---|---|---|---|---|
| DUPE | FINAL DESTINATION | | | | | | |
| COUNT | SH | SD | OW | RX | OR | LH | NONE |
| <2 | ERR_NON DC = 0 | ERR_NON DC = 0 | ERR_NON DC = 0 | ERR_NON DC = 0 | ERR_NON DC = 0 | ERR_NON DC = 0 | ERR_NON DC = 0 |
| >1 | ERR_DUP DC — | ERR_DUP DC — | ERR_DUP DC — | ERR_NON DC = 0 | ERR_NON DC = 0 | ERR_LH DC — | ERR_NON DC = 0 |

Note that the item in each cell is the error code. The second is the action to be performed on the Duplicate Count (DC).

The system and methodology of the present invention can be illustrated by way of the following example, which is described for illustrative purposes only and is not intended to be exhaustive of the potential applicability of the present invention.

ILLUSTRATIVE EXAMPLE

Consider an organization that wishes to print and mail a large batch of material to a set of its customers. First, the organization generates print images within a mainframe host computer, for instance. The print images, representing all or part of the mailpiece to be sent, are forwarded to a printer or printers to be printed on documents such as paper sheet articles. Thus, the content to be mailed is converted from electronic image to physical paper ready to be manipulated in a mail processing environment. The mainframe host computer, in this example, also generates database driven insertion data that is forwarded to the organization's mailroom database server. The database driven insertion data is then inducted or imported into the database driven insertion and mail piece tracking system.

After the material has been printed and the data has been populated into the database, the mail processing machines begin processing the printed material. An operator of the mail processing machine initiates the following process:

(1) Selecting and loading a "Job" for the machine. The job is defined in the database and was created previously by a user with authority and privilege to do so. The job defines (i) reader codes printed on the material, (ii) the "mode" of the machine, (iii) which inserts are loaded into the mailing machine, and (iv) the methods of stapling, folding, printing, etc. for the machine.

(2) Physically loading the material on the mail processing machine.

(3) If the "Name" of the database driven insertion (DDI) data is not specified on the reader codes, the user must select which set of database driven insertion data to use from the database.

(4) At this point, the machine begins processing the paper, following the "Job Level" instructions contained in the Job Setup, and the "Account Level" instructions contained in the database driven insertion data.

Database driven insertion data for the following eight (8) accounts is generated by host computers and sent to the database server computer. The database server computer stores the data in the following manner:

TABLE 4

| Database driven insertion Account Data | | | | | | | | | | | | |
|---|---|---|---|---|---|---|---|---|---|---|---|---|
| Tray ID | IDF ID | Doc ID | Target Dest | Tray Dest | DPBC | Pull Key | User Field | Proc. Dir | Str 0 | Str 1 | Str 2 | Str 3 |
| 4464 | 160 "AA" | 3643 | "SH" | " " | "1111111 1111" | "0000000056721475" | "00000000567 21475" | "NNNNNNNNNYNNNNNN NNNN" | 3 | 0 | 0 | 0 |
| 4464 | 160 "AA" | 3644 | "SH" | " " | "111111 11111" | "0000000059049304" | "00000000590 49304" | "NNNNNNNNNYNNNNNN NNNN" | 3 | 0 | 0 | 0 |
| 4464 | 160 "AA" | 3645 | "SH" | " " | "111111 11111" | "0000000059038117" | "00000000590 38117" | "NNNNNNNNNYNNNNNN NNNN" | 3 | 0 | 0 | 0 |
| 4464 | 160 "AA" | 3646 | "SH" | " " | "111111 11111" | "0000000059052456" | "00000000590 52456" | "NNNNNNNNNYNNNNNN NNNN" | 3 | 0 | 0 | 0 |
| 4464 | 160 "AA" | 3647 | "SH" | " " | "111111 11111" | "0000000059691501" | "00000000596 91501" | "NNNNNNNNNYNNNNNN NNNN" | 3 | 0 | 0 | 0 |
| 4464 | 160 "AA" | 3648 | "SH" | " " | "111111 11111" | "0000000057681793" | "00000000576 81793" | "NNNNNNNNNYNNNNNN NNNN" | 3 | 0 | 0 | 0 |
| 4464 | 160 "AA" | 3649 | "SH" | " " | "111111 11111" | "0000000059307249" | "00000000593 07249" | "NNNNNNNNNYNNNNNN NNNN" | 3 | 0 | 0 | 0 |
| 4464 | 160 "AA" | 3650 | "SH" | " " | "111111 11111" | "0000000058294141" | "00000000582 94141" | "NNNNNNNNNYNNNNNN NNNN" | 3 | 0 | 0 | 0 |

The above table data is defined as follows:

Tray ID Information about the mailing tray the mailpiece belongs to.

IDF ID The IDF data group this mailpiece belongs to. Generally, an IDF corresponds to a print run.

Target Dest The desired "destination" of the mailpiece on the mailing machine. This would correspond to "SH" (Standard Handling),"SD" (Security Divert), "OW" (Overweight).

Tray Dest Information necessary to print a tray tag.

DPBC (Delivery Point Bar Code.) Information necessary to print the Postnet Barcode on the mailpiece.

Pull Key Customer Defined key to look up a particular mailpiece.

User Field Customer Defined key for customer use.

Proc Dir Processing Directives give instructions to the machine regarding whether to Staple, Seal, Drop Inserts, etc on this particular mailpiece.

Str 0–Str3 Page count information for up to three (3) streams of material. Note that these mailpieces only have pages from stream 0.

Print and Verify String Data for these mailpieces appears as follows:

Print String Data

Insert Verify String Data

As the processing of the material progresses, the machine begins to send mailpiece tracking data back to the database. The data sent back for the accounts listed above could, for example, appear as follows:

Table 5 shows that mailpieces 3643, 3644, 3644, 3645, 3646, and 3650 went to destination SH (the “normal” mailable destination), mailpiece 3647 was never “seen” by the machine (because of a read error, for example), 3648 was OR (operator removed) for reason #546 (possibly a jam or some other problem), 3649 was diverted to the R2 (reject bin) for the same reason (#546). Table 5 also shows that the mailpieces were processed during Shift 3 and JobInstance 821. The database contains detailed information about the processing in the Job and Shift tables.

Once the machine finishes processing the mailpieces, reports are generated that show which mailpieces were successful, which need to be reprinted, etc. The reports are fed back into the system to start another print run.

The present invention provides several advantages over prior art systems and methods. First, all types of data stored in the database driven insertion server are related to the other types of data in a way that makes generating very flexible and detailed reports very easy.

Second, since instructions about each mailpiece are stored in the database, the instructions can be modified right up until the time the mailpiece is placed on a machine for processing. This is sometimes referred to as late binding.

TABLE 5

Returned Mailpiece Tracking Account Data

| Fin. Dest | Start Time | Finish Time | Shift ID | Job ID | Weight | Postage | Key Line | Status | Dest Rsn | Inserts Fed | Seq Num | Doc ID | IDF ID | Dup Count |
|---|---|---|---|---|---|---|---|---|---|---|---|---|---|---|
| “SH” | 10/21/199 8 17:49:47 | 10/21/199 8 17:51:07 | 3 | 821 | 251 | “ ” | " | 0 | 1 | “000” | “3” | 3643 | 160 | 0 |
| “SH” | 10/21/199 8 17:49:47 | 10/21/199 8 17:51:07 | 3 | 821 | 251 | “ ” | " | 0 | 1 | “000” | “4” | 3644 | 160 | 0 |
| “SH” | 10/21/199 8 17:49:47 | 10/21/199 8 17:51:07 | 3 | 821 | 251 | “ ” | " | 0 | 1 | “000” | “5” | 3645 | 160 | 0 |
| “SH” | 10/21/199 8 17:49:48 | 10/21/199 8 17:51:07 | 3 | 821 | 251 | “ ” | " | 0 | 1 | “000” | “6” | 3646 | 160 | 0 |
| “OR” | 10/21/199 8 17:49:47 | 10/21/199 8 17:51:07 | 3 | 821 | 251 | “ ” | " | 0 | 546 | “000” | “0” | 3648 | 160 | 0 |
| “R2” | 10/21/199 8 17:51:16 | 10/21/199 8 17:52:36 | 3 | 821 | 251 | “ ” | " | 0 | 546 | “000” | “0” | 3649 | 160 | 0 |
| “SH” | 10/21/199 8 17:51:16 | 10/21/199 8 17:52:36 | 3 | 821 | 251 | “ ” | " | 0 | 1 | “000” | “7” | 3650 | 160 | 0 |

The data for table 5 is defined as follows:

Final Destination The location the mailpiece ended up in on the machine.

Start Time The time the mailpiece began processing on the machine.

Stop Time The time the mailpiece exited the machine.

Shift ID The shift the mailpiece was processed on.

Job ID The Job Instance the mailpiece was processed on.

Weight The final weight of the mailpiece.

Postage The final cost of the mailpiece.

Keyline The keyline printed on the mailpiece (if any).

Status The final status of the mailpiece.

Destination Reason The “reason” the mailpiece went to the destination it did.

Inserts Fed Information about which inserts fed on the mailpiece, and explanations of why.

Sequence Number The sequence number of the mailpiece.

Document ID Used to look up/relate DDI data in the previous table.

IDF ID Used to look up/relate DDI data in the previous table.

Duplicate Count Used to check for, and signal duplicate accounts.

Third, since all mail piece tracking data is kept in the database, one of the reports that can be generated is a standard postal manifest that details all pieces processed and the amount owed the post office. This is sometimes referred to as machine based manifesting.

Fourth, since the mail piece tracking data tracks all mailpieces processed properly and all mailpieces processed improperly, a list of mailpieces to re-produce is easy to produce. This is sometimes referred to as reprint generation.

Fifth, the database contains a physical description (including a scanned image) of all materials to be used in the mailroom. This includes inserts, envelopes, and sheets (of paper). No other mail processing implementation known to the inventors has the ability to show an image of the insert/envelope selected. This feature reduces operator errors by showing the operators pictures of the materials they should be loading into the machine. This is sometimes referred to as centralized materials data.

Sixth, the database contains information about all the machines connected to it and the instructions to the machines for each job. Thus, there is no need to program each machine separately. This is sometimes referred to as centralized job programming.

Seventh, the database contains a list of all defined “barcodes”. When the user programs a job, he/she has the option of creating a new "barcode" map, or selecting one of the already defined ones. There is no need to program the reader map on each individual machine. This is sometimes referred to as centralized reader code map programming.

Eighth, since all mail piece tracking data is in the same database, production reports can be easily generated to show relationships between different machines, operators, shifts, and jobs. This is sometimes referred to as centralized production/efficiency reports.

Ninth, since the mail piece tracking data tells which inserts are fed for each account, and contains the physical descriptions of the inserts, a report detailing the chargeback amounts can be produced. This is sometimes referred to as centralized inserts chargeback reports.

Tenth, descriptions of each user's and each users allowed privileges is kept in the database, and is managed from a single application. This allows management of all operators/users in the mailroom from one central location. This feature allows some (well trained) users to have privileges to perform certain actions with the equipment that other (less well trained) operators would not. The allowed privileges for each user/operator is managed completely by the customer. This is sometimes referred to as centralized user privilege management.

Eleventh, descriptions of each machine are kept in the database. This allows programs like Job Setup to ask questions pertinent only to the machines the job is intended for. It also allows easy access to information about each machine without having to look at the machine computer itself. This is sometimes referred to as centralized machine definition.

Twelfth, the database contains a master event log that contains all events that may be of interest to a user/customer. These events include (but are not limited to) Machine Starting, Machine Stopping, User Logged In, User Logged Out, Job Started, Job Ended, Shift Started, Shift Ended, Job Created, Job Deleted, Job Modified, etc. This is sometimes referred to as a centralized event log.

Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. For instance, the architecture described herein is easily extendible to manage processes not normally associated with the mailroom. Some of these processes include direct billing over the internet, print on demand, archiving collections of documents to a CD-ROM, etc.

In the claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A computer program product for managing database driven insertion and mailpiece tracking data, the computer program product having a medium with a computer program embodied thereon, the computer program product comprising:

(a) a server including:
  (i) computer program code for populating a database with data comprising a plurality of records including instruction sets or handling individual mailpieces;
  (ii) computer program code for accessing the database to extract the instruction sets; and
  (iii) computer program code for responding to requests for the instruction sets from one or more mail processing clients; and (b) a mail processing client including:
  (i) computer program code for reading a key code from an individual mailpiece, the key code corresponding to a database location containing the instruction set for handling the individual mailpiece;
  (ii) computer program code for requesting the instruction set for handling the individual mailpiece from the server;
  (iii) computer program code for performing at least one mail processing task in accordance with the instruction set;
  (iv) computer program code for gathering mailpiece tracking data and for immediately updating the record in the database corresponding to the mailpiece being processed in real time as the at least one mail processing task is performed to indicate the status of the mailpiece in real time; and
  (v) computer program code for forwarding the mailpiece tracking data to the server, wherein the server can store the mailpiece tracking data in the database.

2. The computer program product of claim 1 further comprising computer program code for generating at least one report concerning the performance of at least one mail processing task.

3. The computer program product of claim 1 further comprising computer program code for generating at least one report concerning the tracking of at least one mailpiece.

4. The computer program product of claim 1 wherein the computer program code for performing at least one mail processing test comprises computer program code for performing mail inserting.

* * * * *